United States Patent
Lucht et al.

(10) Patent No.: US 6,352,190 B1
(45) Date of Patent: Mar. 5, 2002

(54) SOLDERING DEVICE

(75) Inventors: Heinz-Olaf Lucht, Krefeld; Tilman Schwinn, Duisburg; Hans-Peter Schmidt, Mettmann; Jens Tauchmann, Berlin, all of (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 09/530,561

(22) PCT Filed: Nov. 3, 1998

(86) PCT No.: PCT/EP98/06962

§ 371 Date: May 1, 2000

§ 102(e) Date: May 1, 2000

(87) PCT Pub. No.: WO99/24208

PCT Pub. Date: May 20, 1999

(30) Foreign Application Priority Data

Nov. 7, 1997 (DE) .......................... 197 49 187

(51) Int. Cl.[7] .................................. B23K 1/08
(52) U.S. Cl. ..................... 228/37; 228/42; 228/219; 228/260
(58) Field of Search .................. 228/180.1, 256, 228/260, 33, 36, 37, 42, 43, 219

(56) References Cited

U.S. PATENT DOCUMENTS

| 4,921,156 A | * | 5/1990 | Hohnerlein |
| 5,071,058 A | * | 12/1991 | Nowotarski |
| 5,121,874 A | * | 6/1992 | Deambrosio et al. |
| 5,203,489 A | * | 4/1993 | Gileta et al. |
| 5,297,724 A | * | 3/1994 | Mehta et al. |
| 5,409,159 A | * | 4/1995 | Connors et al. |
| 5,411,200 A | * | 5/1995 | Connors et al. |
| 5,568,894 A | * | 10/1996 | Gileta |
| 5,722,581 A | * | 3/1998 | Sindzingre et al. |
| 5,941,448 A | * | 8/1999 | Sindzingre et al. |
| 6,074,203 A | * | 6/2000 | Lefurmy et al. |
| 6,116,491 A | * | 9/2000 | Katoh |
| 6,168,065 B1 | * | 1/2001 | Willemen |

FOREIGN PATENT DOCUMENTS

| JP | 07185790 A | * | 7/1995 |
| JP | 410075048 A | * | 3/1998 |

OTHER PUBLICATIONS

WO 99/24208 Lucht et al. (May 20, 1999).*

* cited by examiner

Primary Examiner—Tom Dunn
Assistant Examiner—Kiley Stoner
(74) Attorney, Agent, or Firm—Connolly Bove Lodge & Hutz LLP

(57) ABSTRACT

A soldering apparatus has a solder container and a casing to accommodate a protective-gas atmosphere for soldering printed circuit boards. During transport of the circuit boards through a casing the circuit boards are brought into contact with a solder wave in the container. The casing has an inlet for printed circuit board on an inlet side and an outlet on its outlet side. In addition, the casing has a supply of non-oxidizing gas and an arrangement for admitting gas into the casing. The casing is designed as a modular construction kit having subassemblies and/or constructional elements which comprise an input tunnel, an entry tunnel, at least two covering elements, an outlet tunnel and a detachable connection on the solder container and/or the sub-assemblies and/or constructional elements to connect the sub-assemblies and/or constructional elements and the solder container.

18 Claims, 3 Drawing Sheets

SOLDERING DEVICE

Figure 1:
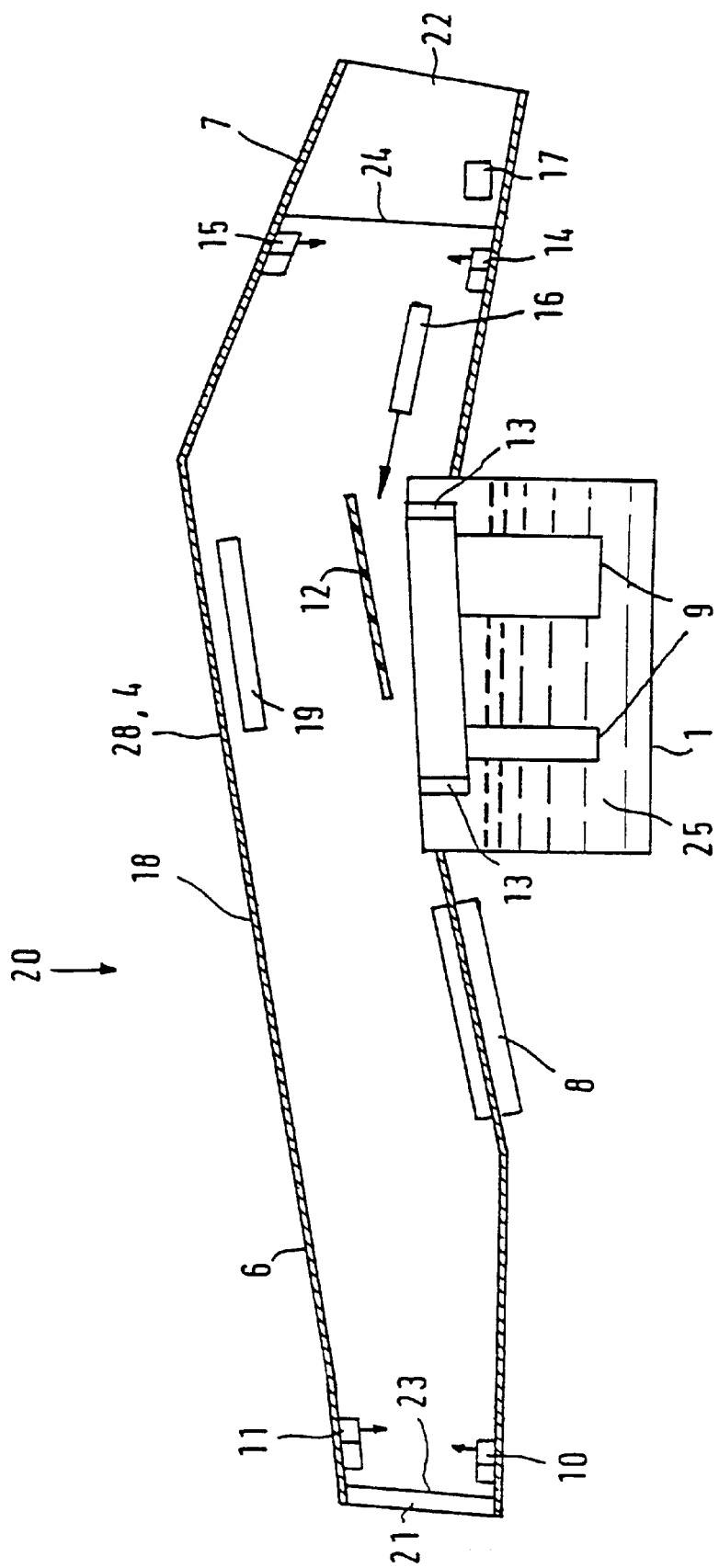

The invention relates to a soldering apparatus and a process for soldering printed circuit boards according to the preamble of claims 1 and 18.

The development of electronics in recent years has led not only to a distinct increase in the integration density of semiconductor components, but has also placed new requirements on circuit board production. In particular, the use of novel components (for example BGA), new surfaces (for example Ni-Pd terminals) and the reduction in size of the terminals themselves (fine pitch) leads to the increasing use of inert gases during soldering. Using the latter, process windows can be enlarged adequately, and the quality of the soldered joints meets the increased requirements.

Since in the meantime the focus of printed circuit board production has been transferred to the reflow technique (SMDs), flow-soldering systems are found in standby over relatively long periods of time (a few hours). During this time, a layer of scale forms on the surface of the solder container as a result of oxidation, from which layer, in the absence of further measures, scale particles are entrained by the solder wave during soldering, and can get onto the printed circuit boards. For this reason, solder containers of such flow-soldering systems are encased, and a protective-gas atmosphere is produced in the casing using a non-oxidizing gas, which effectively suppresses the formation of scale.

In addition, it is often necessary, even when soldering with these earlier flow-soldering systems, to achieve low residual oxygen values in the soldering atmosphere, since in this way the soldering result is distinctly improved; at residual oxygen contents $\leq 1\%$, the number of solder beads is distinctly reduced.

Since very few flow-soldering systems are provided for the use of protective gases, casings and gas distribution systems would be desirable, with which the existing flow-soldering systems could be re-equipped.

To this end, a number of hood or tunnel constructions have already been proposed, but these all satisfy only to some extent the requirements for the re-equipment of existing flow-soldering systems. In DE-U1 8520254 a housing of a soldering apparatus is described which is not suitable for the re-equipment of existing flow-soldering systems, since the expenditure for subsequent rebuilding is much too high. Casings for the re-equipment of existing flow-soldering systems in which printed circuit boards are soldered are described in DE 41 42 436 A1 and EP 500 135 B1. In this case, the hoods dip at least partially into the solder bath, with the result that assembly and disassembly, for example for cleaning the solder container or in the event of repairs to the solder container or to the solder wave prove to be difficult in practice. Furthermore, any detachment of the metal of the casing dipping into the solder bath can impair the soldering operation or the soldering quality. In EP 500 135 B1, by designing the casing as a hood, which closes off only the soldering pan itself but not the supply or discharge of the printed circuit boards, it is possible to achieve adequately low residual oxygen values at all only with a very high inert-gas consumption. As a result of the opening of the soldering zone on the entry of printed circuit boards, a considerable quantity of ambient air also passes into the region of the solder bath, which leads to relatively high residual oxygen contents precisely during the soldering operation.

Furthermore, in EP 500 135 B1 only the region of the solder wave is enclosed by the hood. The devices and/or elements reaching into the solder bath, for example the pumps, are only inadequately provided with a protective-gas atmosphere. Large regions remain exposed to the ambient atmosphere, which makes oxidation of the solder bath possible, and hence leads to the formation of a scale layer.

The invention is based on the object of providing a casing for a soldering apparatus, by means of which the existing flow-soldering systems can be simply and cost-effectively re-equipped.

Starting from the prior art cited in the preamble of claim 1, this object is achieved with the features specified in claim 1.

Advantageous developments are specified in the subclaims.

According to the invention, the casing is designed as a modular construction kit having subassemblies and/or constructional elements, preferably comprising an input tunnel, an entry tunnel, at least two covering elements, in each case a covering element for the region of the solder container that accommodates the printed circuit boards and the solder wave, and a covering element for the region of the solder container that accommodates the devices and/or elements, the two covering elements having a connecting point that runs in the transport direction of the printed circuit boards and together forming a hood which covers the entire solder container and has a projecting apron, an outlet tunnel and detachable connecting means on the solder container and/or the subassemblies and/or constructional elements to connect the subassemblies and/or constructional elements and the solder container. As a result of the design according to the invention of the casing from modular subassemblies/constructional elements, which are joined with low effort at specially designed connecting points, assembly and disassembly at the customer are reduced considerably. Since the modular subassemblies/constructional elements are simply constructed, on the one hand the production is cost-effective and on the other hand high flexibility is ensured, since each subassembly/constructional part can simply be adapted at the customer to the existing flow-soldering system. In this case, the modular construction kit is configured in such a way that it ensures a high degree of sealing and hence low residual oxygen values in the protective-gas atmosphere within the casing are possible. In the case of re-equipping with the casing, the consequent advantage for the customer is that it can rapidly be put to use, since the casing is joined by connecting the modular subassemblies/constructional elements at the specially designed connecting points. Faulty connecting points on the prefabricated modular subassemblies/constructional elements are in this case ruled out. Added to this is the fact that the gas supply for the introduction and distribution of the protective gas in the casing is also modularly constructed, and hence the individual subassemblies/constructional elements are connected to each other in such a way that it is possible to make the existing flow-soldering systems inert with the lowest possible protective-gas consumption. A further reduction in the protective-gas consumption, whilst simultaneously ensuring low residual oxygen contents in the protective-gas atmosphere, is achieved by controlling the gas distribution.

An exemplary embodiment of the invention is illustrated in the drawing and described in more detail below. In the drawing FIG. 1 shows a schematic sectional illustration of the casing FIG. 2 shows a schematic perspective illustration of the casing FIG. 3 shows a schematic illustration of the controller.

Illustrated schematically in section in FIG. 1 is a soldering apparatus which essentially comprises an input tunnel 6, an entry tunnel 18, which can contain heating means 8, a hood 28, 4 surrounding the solder container 1, and an outlet tunnel 7. The solder wave is designated by 9 and a printed circuit board by 12. The printed circuit board 12 is transported through the casing 20 and, during its transport through the casing, is brought into contact with a solder wave 9 in the solder container 1. The casing contains an inlet 21 on an inlet side and an outlet 22 on an outlet side. The inlet and outlet 21, 22 are preferably closed by flaps 23, 24, which are composed of a flexible plastic and cover the entire cross section of the inlet and outlet. Arranged behind the flaps 21, 22 are slot nozzles 10, 11, 14, 15, which produce narrow gas flows over the entire width of the inlet and outlet 21, 22, which act as gas curtains and shield the inlet and outlet from the ambient atmosphere when the flaps 21 and 22 are open. Illustrated in FIG. 1 are in each case two flaps 23, 24 sealing the inlet and outlet, and slot nozzles 10, 11, 14, 15 producing gas curtains. It goes without saying that a design with a plurality of flaps and gas curtains, which form locks, is also possible.

A gas distributor 19 is arranged above the printed circuit boards 12, and a gas distributor 13 is arranged under the printed circuit board 12. The gas distributor 13 encloses the solder waves 9 like a frame. Both the gas distributors 19 and 13 have gap-like outflow openings directed toward the solder bath 25, from which openings a displacement-gas cushion emerges in the direction of the solder bath 25. The displacement-gas cushion of the gas distributor 13 experiences thermal deflection because of the warm solder bath 25 and rises. This rising displacement-gas cushion is opposed to the displacement-gas cushion emerging from the gas distributors 19, which to a large extent suppresses any circulation. In this case, the two displacement-gas cushions are mixed, and temperature equalization takes place.

Figure 2:
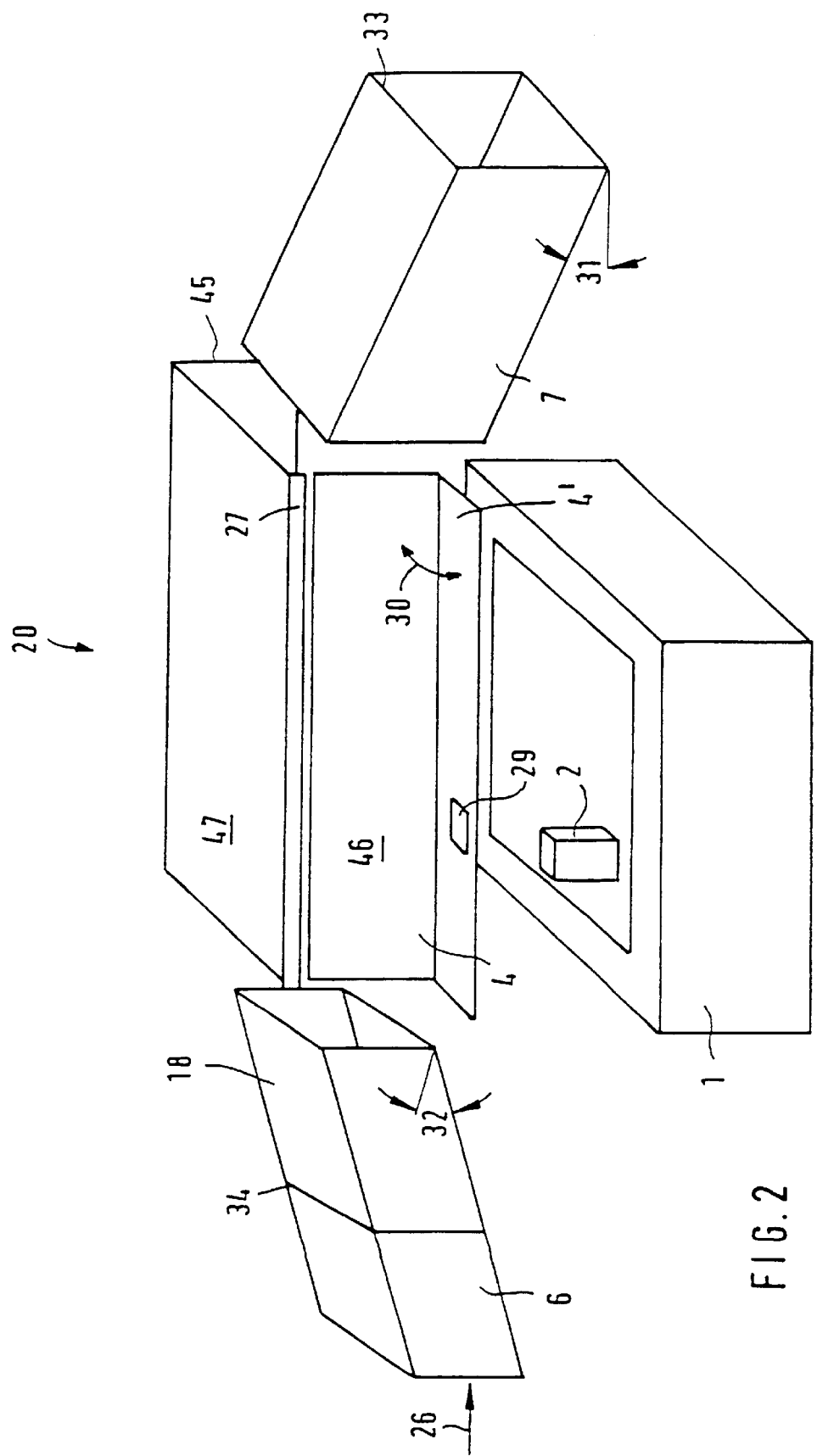
Figure 3:
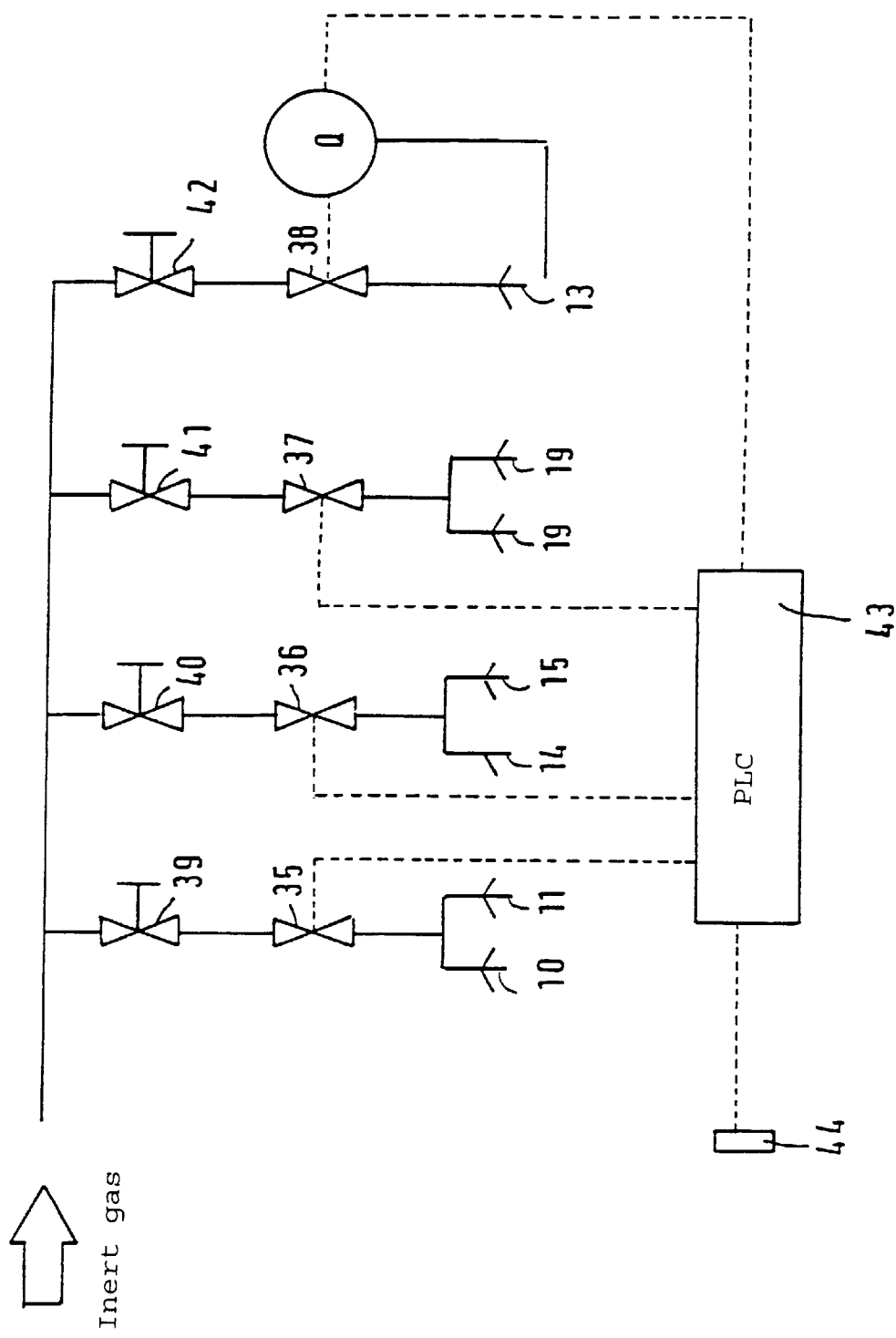

Illustrated schematically in FIG. 2 is the casing 20, which is designed as a modular construction kit. Using the construction kit, simple re-equipping of existing flow-soldering systems can be achieved. The geometry of the casing 20 is therefore configured to be universal, in order that in the individual case no comprehensive design changes have to be undertaken.

Constructional parts identical to FIG. 1 are designated in FIG. 2 using the same reference numbers. The objective of the casing 20 is to achieve the soldering process under a protective-gas atmosphere with the lowest possible residual oxygen concentration in the casing 20. The casing therefore has an input tunnel 6, which is fastened to an entry tunnel 18 via detachable connecting means. Heating means 8 are provided in the entry tunnel 18. The latter merges into the hood 28, 4 with apron 4' covering the solder container 1, said hood sealing off the entire soldering zone, that is to say including the regions of the solder container which contain leadthroughs, for example for pumps or scooping regions. The hood 28, 4 with apron 4' comprises two covering elements, in each case a covering element 28 for the region of the solder container 1 that accommodates the printed circuit boards 12 and the solder wave 9, and in each case a covering element 4 for the region of the solder container 1 that accommodates the devices 2 and/or elements. The two covering elements 28, 4 have a connecting point 27 that runs in the transport direction 26 and at which the two covering elements 28, 4 can be detachably connected to one another via connecting means, for example screws. The two covering elements 28, 4 together form a hood covering the entire solder container and having a projecting apron 4', which covers the region of the solder container 1 which contains leadthroughs, for example for pumps or scooping regions. To this end, the apron 4' has openings 29 through which the devices 2 and/or elements pass during the assembly of the casing 20. The openings 29 can easily be adapted to any built-in fittings 2 or scooping regions projecting into the solder container 1. The devices and/or elements, such as pumps, are not enclosed.

The covering element 4 for the region of the solder container that accommodates the devices and/or elements is of essentially L-shaped design, the part which extends from the apron 4' at an angle 30, preferably at virtually a right-angle, being designed as a side wall of the hood 28, 4. The outlet tunnel 7 is fastened to the hood 28, 4 via connecting means at connecting points that are not illustrated in more detail. By arranging the outlet tunnel 7 at a falling angle, and the preceding entry tunnel 18 at a rising angle 32, a high point is provided over the solder waves 9. In this case, the inlet and outlet tunnels are preferably lengthened to such an extent that the upper end edge 33, 34 is arranged underneath the solder bath 25. When using an input tunnel 6, the end edge 34 is displaced toward the end edge of the inlet tunnel 6. As a result, the heated protective gas is kept over the soldering region, even when the flaps 23, 24 are open. Cold ambient air, which is concomitantly flushed into the soldering apparatus at the time of entry or exit of printed circuit boards 12, can thus pass into the central region only after being heated. As a result of the arrangement of the gas distributors 19 and 13, the entry of a large amount of ambient air, and the admixing of ambient air are prevented.

For the purpose of simple assembly and dis-assembly, all the connections are designed as screw and/or clamp connections. All the seals between the connecting points 27 are, for example, implemented as heat-resistant silicone seals. The casing 20 may contain viewing windows at any desired points, which make observation of the soldering process possible.

The modular construction kit can be adapted relatively simply to the local circumstances, which can be carried out rapidly and cost-effectively with modern CAD systems. Following its assembly, the entire casing constitutes a rigid, leakproof subassembly.

In order to suppress solder beads, a nozzle 16 is fitted in the casing in the outlet tunnel 7, which deliberately renders the trailing edge of the second solder wave inert. This gas flow is directed and can also be preheated by heating means arranged in the nozzle 16, in order to prevent excessively rapid solidification of the solder and to blow off excess solder.

By means of the combination of a large-area introduction of a large quantity of gas via the gas distributors 19, which produce no temperature differences in the large-area distribution of the gas, and the introduction of a low, but directed, pre-heated quantity of gas directly into the trailing edge, process stabilization is achieved.

In order to cool the subassembly a nozzle 17 leads a cold gas jet onto the printed circuit boards. This nozzle 17 is arranged in the outlet tunnel 7, outside the casing enclosing the protective-gas atmosphere.

All the gas distributors 19, 13 and slot nozzles 10, 11, 14, 15 are controlled separately via valves 35, 36, 37, 38 (FIG. 3). Connected upstream of each is a manual valve 39, 40, 41, 42, in order to set a quantity. It is of course also possible to lay out all the feed lines as multiples, and by connecting them suitably, to adapt the gas throughput to the operating sequence of the soldering apparatus over wide ranges. Control is performed either by the computer of the soldering apparatus or via a separate programmable logic controller 43 (PLC). The protective-gas supply is initiated directly after starting up by actuating a switch 44, which generates a starting signal. The residual oxygen values in the casing are set in the range of low concentrations via the controller 43. For this purpose, all the gas distributors 19, 13 and slot nozzles 10, 11, 14, 15 are enabled in the sequence 19 and 13, then 14 and 15 and then 10 and 11. After reaching a preset residual oxygen value, only a distinctly lower inert gas flow is introduced, which only compensates for the unavoidable losses as a result of leaks. To this end, only the gas distributors 13, 19 continue to be operated. The slot nozzles 10, 11, 14, 15 are switched off when the flaps 23, 24 are closed. The gas distributor 19 is controlled in accordance with a set desired value.

In order to measure the residual oxygen content, a suction pipe is fitted in the soldering zone, between the solder waves 9. Gas is led away from the soldering zone through said suction pipe, by means of a measuring gas pump. Still ahead of the suction pump, the gas is led through a cold trap, in which any soldering vapors, for example flux, condense. By this means, measuring cells are kept free of soldering residues. The gas then passes through a filter set, on which the residual charge is absorbed. Only relatively noncombustible material, for example zeolite, is used as absorber. The residual oxygen content is determined by means of oxygen measuring cells (for example lambda probes). Since oxygen contents in the percent range are present in the soldering zone during the starting-up operation, two parallel-connected measuring cells are used. One measuring cell with a coarse sensitivity down as far as 0.1% $O_2$, the other measuring cell for the range below this. The measuring cell for the upper range is enabled first, for example using the valves 37, 38, so that the starting-up phase can be followed. When the oxygen concentrations reach values at their lower sensitivity limit, the other measuring cell is enabled. If the values rise toward the upper sensitivity value, the latter measuring cell is isolated once more from the gas supply, and an alarm is triggered.

What is claimed is:

1. A soldering apparatus having a solder container and a casing to accommodate a protective-gas atmosphere for the soldering of printed circuit boards which, during their transport through the casing, are brought into contact with a solder wave in the container, the casing having an inlet for printed circuit boards on an inlet side and an outlet for printed circuit boards on an outlet side, as well as having a supply of non-oxidizing gas and having an arrangement for admitting gas into the casing, wherein the casing is designed as a modular construction kit having subassemblies and/or constructional elements, comprising—an input tunnel—an entry tunnel—at least two covering elements, in each case a covering element for the region of the solder container that accommodates the printed circuit boards and the solder wave, and a covering element for the region of the solder container that accommodates the devices and/or elements, the two covering elements having a connecting point that runs in the transport direction of the printed circuit boards and together forming a hood which covers the entire solder container and has a projecting apron—an outlet tunnel and detachable connecting structure on the solder container and/or the subassemblies and/or constructional elements to connect the subassemblies and/or constructional elements and the solder container.

2. The soldering apparatus as claimed in claim 1, wherein the covering element for the region of the solder container that accommodates the devices and/or elements is of essentially L-shaped design, and the apron covering the region of the solder container has openings through which the devices and/or elements pass.

3. The soldering apparatus as claimed in claim 1, wherein the part that extends from the apron at an angle is designed as a side wall of the hood.

4. The soldering apparatus as claimed in claim 3, wherein the angle is a right-angle.

5. The soldering apparatus as claimed in claim 1, wherein the outlet tunnel is arranged at an angle falling with respect to the hood, and the inlet tunnel is arranged at an angle rising with respect to the hood, in such a way that a high point is produced over the solder waves.

6. The soldering apparatus as claimed in claim 1, wherein the upper end edges of the inlet and outlet tunnels are arranged underneath the solder bath.

7. The soldering apparatus as claimed in claim 1, wherein the entry tunnel and/or the input tunnel comprises heating means.

8. The soldering device as claimed in claim 1, wherein the connecting means are designed as detachable screw or clamp connections, which connect the subassemblies and/or constructional parts to one another.

9. The soldering apparatus as claimed in claim 1, wherein slot nozzles, which are directed toward one another, are connected to the supply of non-oxidizing gas and form a protective-gas curtain for the inlet and outlet, are arranged in the transition regions between the hood and the inlet tunnel and outlet tunnel, the protective gas of the protective-gas curtain flowing away toward the inlet and outlet tunnel.

10. The soldering apparatus as claimed in claim 9, wherein at least the slot nozzles and the gas distributors are connected via supply lines to the supply of non-oxidizing gas, and at least one controllable on/off valve is arranged in each line.

11. The soldering apparatus as claimed in claim 1, wherein, on the sides connecting the inlet and outlet sides and/or on the regions of the hood upper side that are assigned to these sides, in each case there is arranged, above the printed circuit boards, a gas distributor, which is connected to the supply of non-oxidizing gas and produces a displacement-gas cushion that propagates essentially in the direction of the solder container.

12. The soldering apparatus as claimed in claim 1, wherein, underneath the printed circuit board there is arranged a gas distributor, which surrounds the solder wave, has at least one exit opening directed toward the solder bath and is connected to the supply of non-oxidizing gas, and from which a displacement-gas cushion emerges.

13. The soldering apparatus as claimed in claim 1, wherein there is arranged in the outlet tunnel a nozzle, which is connected to the supply of non-oxidizing gas and produces a preheated gas flow directed onto the trailing edge of the solder wave.

14. The soldering apparatus as claimed in claim 13, wherein surface heaters are arranged in the nozzle.

15. The soldering apparatus as claimed in claim 1, wherein there is arranged in the outlet tunnel a gas-jet nozzle, which is connected to a cold-gas generator and produces a cold-gas jet directed onto the printed circuit boards.

16. The soldering apparatus as claimed in claim 1, wherein an adjusting valve is in each case connected upstream of the valves.

17. The soldering apparatus as claimed in claim 16, wherein the valves are connected via control lines to a controller.

18. The soldering apparatus as claimed in claim 17, wherein at least two parallel-connected measuring cells are arranged to determine the residual oxygen content of the protective-gas atmosphere in the form of a current value, wherein the current value is compared with a desired value stored in the controller or in a separate evaluation unit and wherein, in the event of a difference between current and desired values, the valves of the gas distributors are opened or closed.

* * * * *